United States Patent
Ashwood-Smith et al.

(10) Patent No.: US 12,136,993 B2
(45) Date of Patent: Nov. 5, 2024

(54) METHOD AND APPARATUS FOR RADIO ACCESS SIDE RESPONSE TO PREDICTABLE SATELLITE BACKHAUL OUTAGES

(71) Applicant: HUAWEI TECHNOLOGIES CO., LTD., Shenzhen (CN)

(72) Inventors: Peter Ashwood-Smith, Gatineau (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 513 days.

(21) Appl. No.: 17/531,181

(22) Filed: Nov. 19, 2021

(65) Prior Publication Data

US 2023/0163838 A1 May 25, 2023

(51) Int. Cl.
*H04B 7/185* (2006.01)
*H04W 24/02* (2009.01)
*H04W 36/30* (2009.01)
*H04W 52/02* (2009.01)

(52) U.S. Cl.
CPC ........ *H04B 7/18519* (2013.01); *H04W 24/02* (2013.01); *H04W 36/305* (2018.08); *H04W 52/0229* (2013.01)

(58) Field of Classification Search
CPC .......... H04B 7/18519; H04W 36/305; H04W 24/02; H04W 52/0229
See application file for complete search history.

(56) References Cited

U.S. PATENT DOCUMENTS

| | | | | |
|---|---|---|---|---|
| 4,983,980 A | * | 1/1991 | Ando | G01S 19/28 455/12.1 |
| 5,574,969 A | * | 11/1996 | Olds | H04B 7/18539 455/452.2 |
| 6,070,073 A | | 5/2000 | Maveddat et al. | |
| 6,185,409 B1 | | 2/2001 | Threadgill et al. | |
| 8,254,943 B1 | | 8/2012 | Dinan | |
| 12,035,170 B2 | | 7/2024 | Xenakis et al. | |
| 2012/0299702 A1 | * | 11/2012 | Edara | G01C 21/30 340/8.1 |
| 2013/0310025 A1 | | 11/2013 | Black et al. | |
| 2014/0022900 A1 | | 1/2014 | Salot | |
| 2014/0187236 A1 | | 7/2014 | Chiang et al. | |

(Continued)

FOREIGN PATENT DOCUMENTS

| CN | 1142736 A | 2/1997 |
|---|---|---|
| CN | 112715053 A | 4/2021 |

(Continued)

*Primary Examiner* — Dominic E Rego

(57) ABSTRACT

For a communication network using a satellite-involved backhaul, the backhaul outage and restoration states are predicted based on satellite motion data. Based on such predictions, devices providing the radio access portion of the communication network, and devices using the communication network schedule or take actions. Actions can include but are not necessarily limited to: powering equipment up or down, notifying devices or users of upcoming outage or restoration events, inhibiting actions that cannot be completed before an outage, inhibiting new network attachments, adjusting sleep/wake schedules, and providing a local version of a core network or other network.

20 Claims, 12 Drawing Sheets

(56) References Cited

U.S. PATENT DOCUMENTS

| | | |
|---|---|---|
| 2017/0048109 A1 | 2/2017 | Kant et al. |
| 2019/0137614 A1* | 5/2019 | Calmettes ............ G01S 13/5244 |
| 2019/0335345 A1 | 10/2019 | Yan et al. |
| 2020/0267596 A1 | 8/2020 | Sudarsan et al. |
| 2021/0399797 A1 | 12/2021 | Khan et al. |
| 2022/0030657 A1 | 1/2022 | Yamine |
| 2022/0052753 A1 | 2/2022 | Speidel et al. |
| 2022/0095194 A1 | 3/2022 | Sheng et al. |
| 2022/0110179 A1 | 4/2022 | Sheng et al. |
| 2022/0163677 A1* | 5/2022 | Muthuraman .......... G01S 19/07 |
| 2023/0062393 A1 | 3/2023 | Khan |
| 2023/0370858 A1 | 11/2023 | Kotagiri et al. |
| 2024/0119369 A1 | 4/2024 | Cyras et al. |

FOREIGN PATENT DOCUMENTS

| | | |
|---|---|---|
| CN | 112789908 A | 5/2021 |
| CN | 113056877 A | 6/2021 |
| CN | 113169795 A | 7/2021 |

\* cited by examiner

METHOD AND APPARATUS FOR RADIO ACCESS SIDE RESPONSE TO PREDICTABLE SATELLITE BACKHAUL OUTAGES

CROSS-REFERENCE TO RELATED APPLICATIONS

This is the first application filed for this invention.

FIELD OF THE INVENTION

This disclosure pertains generally to the field of wireless communications and in particular to operations by radio access network devices, and devices connected to a radio access network, where the radio access network uses a satellite backhaul.

BACKGROUND OF THE INVENTION

Communication networks distributed over a large geographic area can include a central core component providing core network functionalities and one or more remote components each providing localized network access via wireless communication. The remote component is often referred to as a radio access portion of the network and may include a fronthaul network which connects component devices together. End devices, such as wireless user equipment devices, can wirelessly communicate with devices in the radio access portion. The radio access portion often acts as an intermediary, communicating over a backhaul link with the core portion to enable communication between the end device and the core portion, and potentially to other devices via the core portion.

To cover large geographic areas, the backhaul link can be provided partially or fully using a satellite communication link. A satellite, such as a low earth orbit satellite, or a network involving one or more low earth orbit satellites, can be used to provide such a backhaul link. However, except for satellites in geostationary orbit (which may not be good candidates for providing backhaul links due for example to propagation delays), satellites move with respect to the ground. This can lead to satellites moving out of range of the network central component or remote component, resulting in a backhaul outage. Even with a network of satellites which sequentially cover a given area, some outages are to be expected in realistic implementations. It is therefore necessary to develop solutions for handling such backhaul outages in a way that mitigates operation problems or user experience problems.

Therefore, there is a need for a method and apparatus for operating radio access network devices, the radio access network serviced by a backhaul involving satellite communication links, and devices using such a radio access network, that obviates or mitigates one or more limitations in the prior art.

This background information is intended to provide information that may be of possible relevance to the present invention. No admission is necessarily intended, nor should be construed, that any of the preceding information constitutes prior art against the present invention.

SUMMARY OF THE INVENTION

Embodiments of the present disclosure generally provide for a method and apparatus for performing certain actions in response to a predicted future outage in a backhaul network involving a satellite communication link. The outage is due at least in part to the orbital position and state of a satellite providing part or all of the backhaul network. The state of the satellite can be active or non-active (e.g. failed). A satellite that is overhead and thus in a good orbital position can nevertheless be in a non-active state, thus causing an outage. Alternatively, it can be considered that a non-active satellite does not form part of the satellite network. However, for greater certainty the outage may be considered to depend on both orbital position and state. Because satellites follow regular orbits, such outages can be reliably predicted. A variety of actions can be taken in response to a predicted outage, such as actions which improve user experience for example by providing notifications, actions which conserve device power consumption, and actions which reduce communication operations that would be unproductive due to the outage. As subsequent restoration of the backhaul network can be similarly predicted, some embodiments provide for a method and apparatus for performing certain actions (e.g. reversing the actions listed above) in response to a (e.g. predicted) restoration of the backhaul network following an outage.

According to an embodiment of the present disclosure, there is provided a method for handling backhaul outages. The method includes determining a predicted future occurrence of an outage in a backhaul network. The outage is due to orbital position and state of satellites forming at least part of the backhaul network. The outage interrupts communication between a radio access portion of a communication network and a core portion of the communication network. The method includes, in response to determining the predicted future occurrence of the outage, scheduling or performing an action. The action may be an action at one or both of: a device providing the radio access portion of the communication network; and a device using the radio access portion. The action is performed at a time prior to a beginning of the outage.

According to an embodiment of the present disclosure, there is provided an apparatus comprising a computer processor, a memory and a communication interface and configured to handle backhaul outages. The apparatus is configured to determine a predicted future occurrence of an outage in a backhaul network. The outage is due to orbital position and state of satellites forming at least part of the backhaul network. The outage interrupts communication between a radio access portion of a communication network and a core portion of the communication network. The apparatus is configured, in response to determining the predicted future occurrence of the outage, to schedule or perform an action at one or both of: a device providing the radio access portion of the communication network; and a device using the radio access portion. The action is performed at a time prior to a beginning of the outage.

In various embodiments, the action includes one or more of: proactively suspending communication operations in an orderly manner; powering down communication equipment of the radio access portion; powering down part or all of the device using the radio access portion; and configuring a sleep/wake schedule of the device accessing the communication network using the radio access portion.

In some embodiments, action is performed at a first time interval prior to the beginning of the outage, and wherein the action comprises inhibiting start of one or more operations which require a duration for completion which is greater than the first time interval. In some embodiments, the action includes producing a notification of the outage, the notification being directed toward a user or toward the device using the radio access portion. In some embodiments, the notification is produced at the time prior to the beginning of the outage and indicates a time corresponding to the beginning of the outage. In some embodiments, the notification indicates a predicted future end time of the outage. In some embodiments, the action includes activating a local version of the core network portion. The local version is implemented using only equipment in the radio access portion of the communication network. The action further includes producing a notification that the local version of the core network portion is active. The notification is directed toward a user or toward the device using the radio access portion.

In some embodiments, action includes one or more of: transmitting a notification to one or more devices including the device using the radio access portion; performing a controlled detach procedure involving said one or more devices; and inhibiting or rejecting new attach requests from said one or more devices.

In some embodiments, the action includes determining a predicted future end time of the outage; and in response to determining the predicted future end time of the outage, scheduling or performing a further action at one or both of: the device belonging to the radio access portion of the communication network; and the device using the radio access portion, the further action being performed at or in advance of the end time. In some further embodiments, the further action includes one or more of: resuming suspended communication operations; powering up communication equipment of the radio access portion; powering up part or all of the device using the radio access portion; configuring a sleep/wake schedule of the device using the radio access portion; producing a notification of an end of the outage, the notification being directed toward a user or toward the device using the radio access portion; producing a notification of the end time, the notification being directed toward the user or toward the device using the radio access portion; transmitting a notification to one or more devices including the device using the radio access portion; and performing a controlled reattach procedure involving said one or more devices.

According to an embodiment of the present disclosure, there is provided a device, in a radio access portion of a communication network, which is configured as described above.

According to an embodiment of the present disclosure, there is provided a device, using a radio access portion of a communication network, which is configured as described above.

Potential advantages of the present disclosure include reduced costs, improved spectral efficiency, improved energy efficiency, and improved user experience. Because satellite backhaul outages are better tolerated, satellite network requirements can be reduced, thus providing a cost and equipment savings. Because the outages are predicted and measures taken in anticipation of outage beginnings and ends, operation of the communication network and user experience can be improved. Because certain actions may be inhibited and certain equipment may be powered down, power usage and communication channel usage is reduced. This may improve battery life or other costs.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

It will be noted that throughout the appended drawings, like features are identified by like reference numerals.

DETAILED DESCRIPTION OF THE INVENTION

In various implementations, a backhaul communication link is understood to refer to the communication interface between a radio access network (e.g. a 4G, 5G or 6G network as defined by the 3$^{rd}$ Generation Partnership Project) and the core networking elements of a network. A backhaul communication link can be a single end-to-end communication link. More generally, a backhaul communication link can involve multiple devices networked together, in which case backhaul communications can be performed in a multi-hop manner or over a set of parallel links. For purposes of the present disclosure, a "backhaul network" is considered to include a pair of devices implementing a single backhaul communication link, or the single backhaul communication link itself, or a set of communication links, or associated devices in a multi-hop, parallel, or combination communication arrangement. The backhaul network can include one or more satellites, at least one of which communicates with a ground station. Two or more satellites may communicate with each other to implement the backhaul network. A backhaul can be regarded as a logical connection over a network (e.g. an IP network) between a radio access network and a core network. Generally speaking, a variety of technologies can be used to create an IP tunnel for supporting such a backhaul. For example, traditionally Ethernet, Ring networks, optical fiber and microwaves have been used for supporting backhauls.

Figure 1:
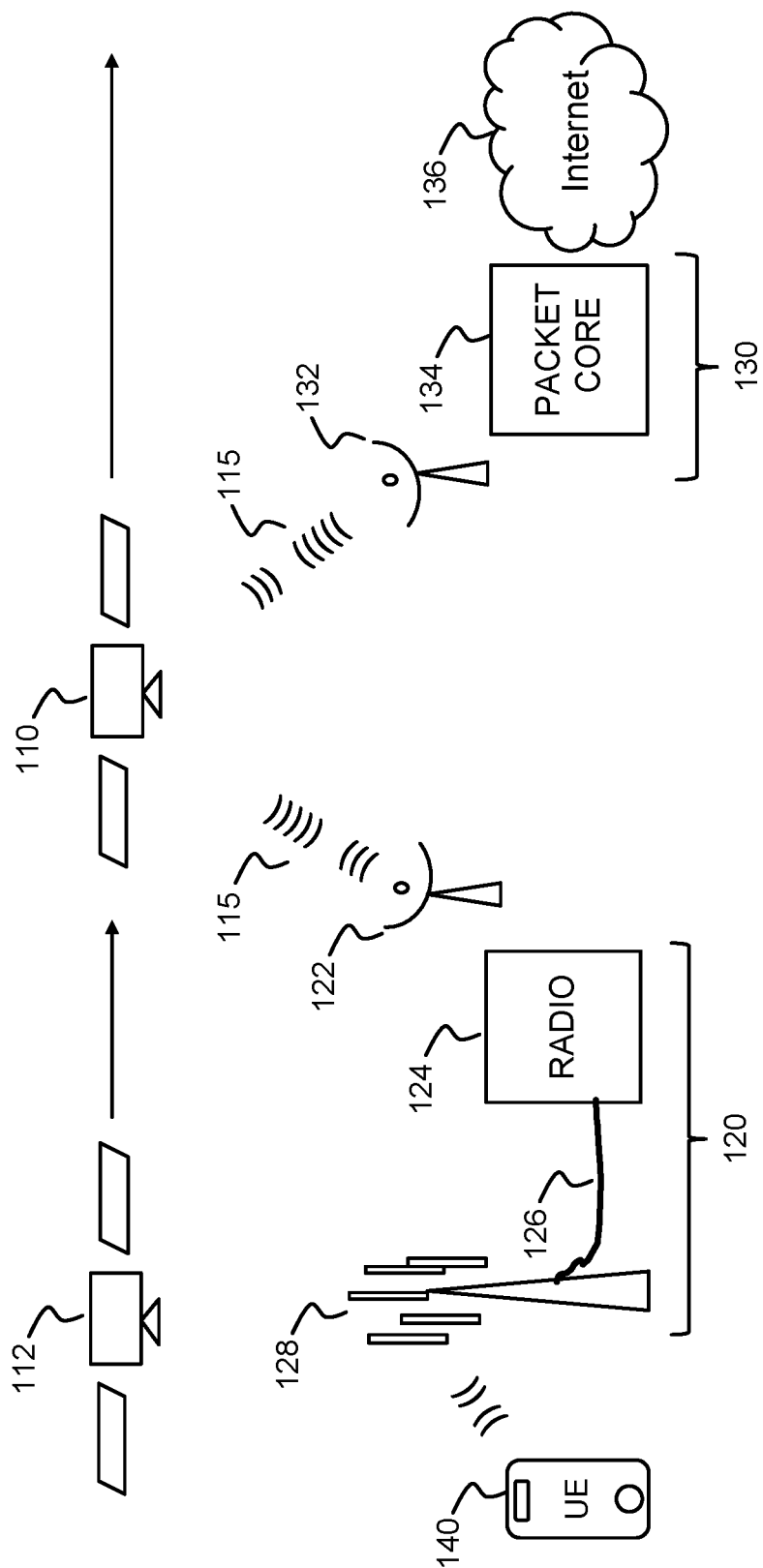
FIG. 1 illustrates a communication network supported by a satellite backhaul, according to an embodiment of the present disclosure.

An example of physical devices supporting backhauls is a satellite network, such as a single Low Earth Orbit (LEO) satellite or a network involving one, two or more of such LEO satellites. FIG. 1 illustrates an example of such a backhaul. According to FIG. 1, a LEO satellite 110 provides a backhaul link 115 between a ground station 122 associated with a radio access network 120 and a ground station 132 associated with a core network 130. As shown, only a single LEO satellite 110 is involved. However, more generally a backhaul network including at least one LEO satellite may be involved. For example, one LEO satellite 112 may communicate with the ground station 122 while another LEO satellite 110 may communicate with the ground station 132. The two LEO satellites 110, 112 may be directly or indirectly communicatively coupled together to form the backhaul network.

The core network 130 includes a packet core 134, which may include various communication and computing devices as traditionally provided in a packet core network. The packet core 134 may be communicatively coupled to external networks, such as the Internet 136. The radio access network 120 may include a radio 124, a fronthaul link (or network) 126, and radio access equipment 128 such as radio access nodes, base stations, baseband units, remote radio heads, or components thereof, or the like, as are traditionally provided. Devices 140, such as user equipment (UE) devices, machine to machine devices (M2M or MTC), etc. wirelessly communicate with the radio access network 120, thus using the radio access network, for example to access the network as a whole, including the core network and beyond.

Figure 2:
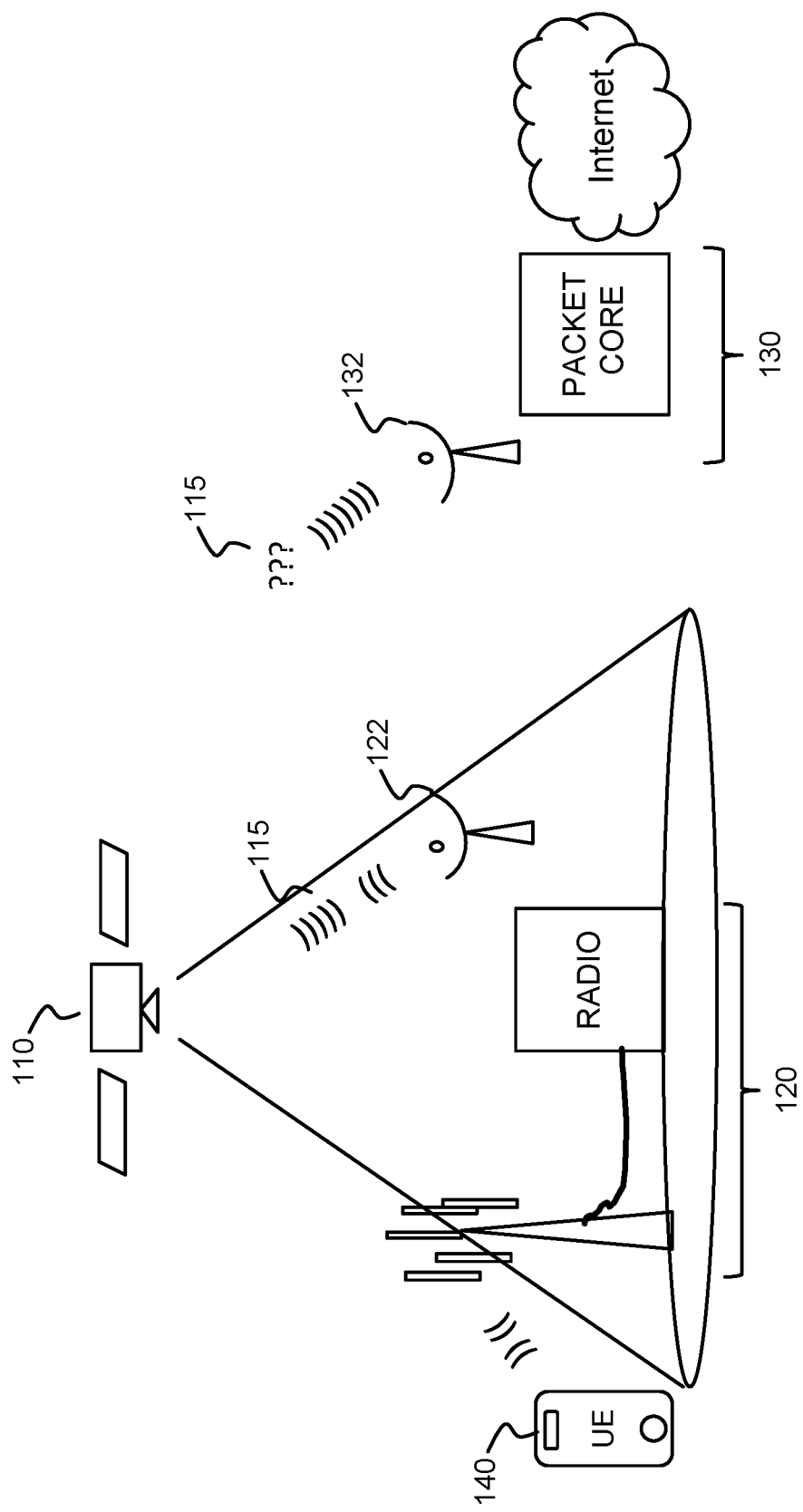
FIG. 2 illustrates a communication network supported by a satellite backhaul which is in an outage state, according to an embodiment of the present disclosure.

FIG. 2 illustrates an example configuration, similar to FIG. 1, but with the backhaul link 115 in an outage state. The LEO satellite 110 which previously communicated with both ground stations 122 and 132 has moved in its orbit to a location which is out of range (e.g. below the horizon) with respect to the ground station 132. Furthermore, it is assumed that no other LEO satellites or other links of the backhaul network are in a position to communicate with the ground station 132. Thus, communication between the radio access network 120 and the core network 130 is interrupted, and communication between the device 140 and the core network 130 and beyond is correspondingly interrupted.

Knowing the locations and orbits of satellites, such outage states, and subsequent restorations corresponding to the end of outage states, are generally predictable in advance. For example, given a constellation of satellites at known altitudes and with known directions of motion and known radio coverage characteristics, locations on the Earth for which no satellites are overhead in a position allowing for communication can be predicted using computer modeling. An example is a constellation of 1500 satellites in a 53 degree Walker Delta constellation arrangement, at an altitude of 550 km, and with phased antenna arrays directed directly downward and having a 45 degree conical radio coverage zone. As will be readily understood by a person skilled in the art, the 53 degrees is the angle the orbit makes relative to the equator.

Outage predictions can be used to predict "holes" in coverage (i.e. areas without backhaul network service), as a function of geographic ground location and time. That is, for a particular latitude and longitude, predictions can be made of future times during which satellite backhaul outages are expected to occur, with respect to service of ground-based equipment. The outage can be regarded as an outage in a backhaul network, and is due to orbital positions and states of one or more satellites forming at least part of the backhaul network. Such an outage interrupts communication between the radio access (RAN) portion of the communication network and a core portion of the communication network. Cycles of outages are expected to repeat over time, because of the orbital nature of the satellites. Coverage holes may be due to satellite failures, chosen orbital topologies, reduced satellite deployments for budgetary reasons, or the like, or a combination thereof.

In some embodiments, backhaul state change predictions, such as outage predictions and subsequent backhaul non-outage (restoration) predictions can be performed by a computing device and communicated in advance to various other devices. In some embodiments, certain devices may make their own outage predictions, for example based on location and time information, which may be obtained from a global positioning system (GPS) module or other source. A prediction can indicate the time(s) at which the backhaul is in a given state (outage or non-outage) and when the transition between states occurs, i.e. the time boundaries of the state instances. It is noted that embodiments of the present disclosure can perform actions in response to a change in backhaul state, for example from non-outage to outage state, or from outage to non-outage state.

Figure 3:
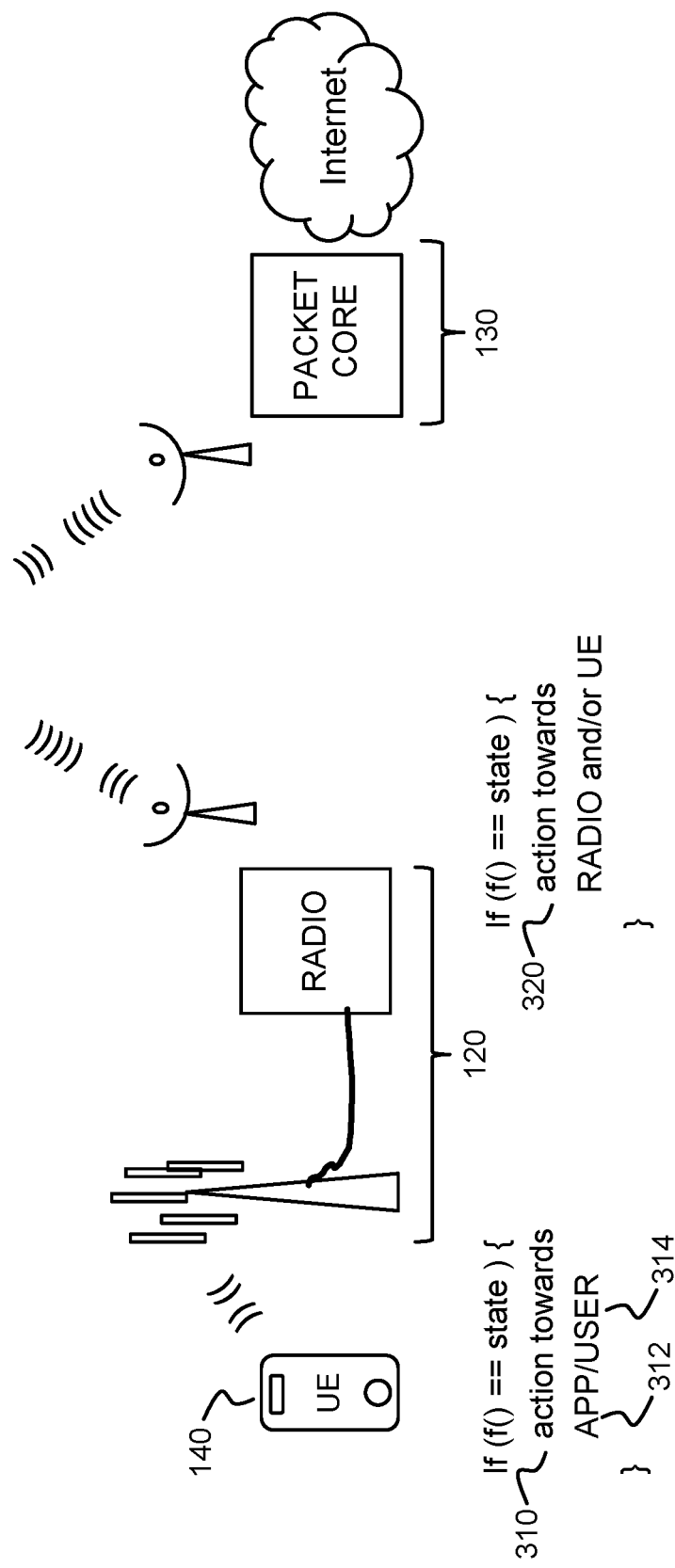
FIG. 3 illustrates a communication network taking an action in response to a satellite backhaul state, according to an embodiment of the present disclosure.

Embodiments of the present disclosure make or receive a set of outage predictions for satellite backhaul links, and subsequently, in response to the prediction, schedule, perform, or both schedule and perform, one or more actions. As illustrated in FIG. 3, in some embodiments an action 310 can be performed toward an application 312 (e.g. running on a device 140 accessing the RAN) or toward a user 314 of such an application or device. As also illustrated in FIG. 3, in some embodiments an action 320 can be performed toward a device belonging to (i.e. providing a portion of) the RAN 120, or toward a device 140 accessing the RAN. In FIG. 3 the expression f( ) refers to a function which expresses, for a given time, whether the backhaul is in or is predicted to be in an outage state or non-outage state, either possibility being taken on by the variable "state." An action 310, 320 can be initiated or performed by a device in the backhaul 120, or an action 310, 320 can be initiated or performed by a device 140 accessing the RAN. The action can be taken substantially at the time of, or in advance of, a change in state as expressed by f( ). An action can be taken by one device toward itself, or by that device toward another device or a user.

The outage prediction can include a specified time in the future when an outage event is expected to occur. An action may be performed in response to the prediction either at a time corresponding to a beginning of the outage, or at a time prior to (e.g. just prior to, immediately before) the beginning of the outage. Alternatively, in some embodiments the action may be performed substantially at a time corresponding to (i.e. synchronous with) the beginning of the outage. Some actions may be performed a particular amount of time prior to the outage beginning, where that particular amount of time (time interval) is set as appropriate for the action. For example, if the action is to notify a user of an upcoming outage, the action may be taken in time for the user to plan for the outage, or to refrain from beginning an activity that will be interrupted by the outage, due to an expected duration of the activity (e.g. a download, a video streaming action or a voice call). If the action is to power down a piece of equipment or prepare for such a power down, the action may be taken sufficiently in advance of the outage that it can be reliably completed prior to (e.g. just prior to) the beginning of the outage. Or, the action can be taken at or even after the beginning of the outage, if power usage is less of a concern than network uptime. In some embodiments, the action is performed at a time which is a first amount of time (i.e. a first time interval) prior to the beginning of the outage. In such a case, the action may include inhibiting start of one or more operations which require a duration for completion which is greater than the first time interval.

There are a variety of types of actions which can be performed in accordance with embodiments of the present disclosure. For example, actions can be taken which improve communication network operations or efficiency, or which improve user experience, or a combination thereof. Actions can be taken which limit problems or inefficiencies which are caused due to backhaul outages. Actions can be taken which directly or indirectly inhibit operations (e.g. communication attempts) which would require the backhaul when the backhaul is in an outage state. Actions can be taken which cause a change to a device's user interface, such as a graphical display or audio output, or user interface outputs. Actions can be taken which cause a change to a component of the device, such as a power management module, radio module or associated communication management module. Examples of actions, commensurate with the above, include suspending communication operations by one or more devices; powering down communication equipment of the radio access portion; powering down part or all of a device using the radio access portion; scheduling a power down, power up, or other operation, and configuring a sleep/wake schedule of a device accessing the communication network using the radio access portion. Suspending of communication operations can be done in a proactive and orderly manner. For example, the suspension can involve a controlled shut down, detachment procedures, etc. The suspension can involve messaging between communicating entities indicative of the suspension, for example transmitting notifications of the suspension, and where applicable acknowledgements. The suspension can involve communicating when the suspension will begin, end, or both, and how the beginning, end, or both of the suspension will occur.

In various embodiments, an action can include transmitting a notification. In other embodiments, an action may include adjusting some device operation in response to receipt of such a notification. A notification may be an instruction to perform an action. A notification may be a warning, in response to which an action can be taken if a local determination is made to do so. An action can include producing (e.g. generating and transmitting) a notification of an outage or an end of an outage. The notification may include the predicted start time, end time, or both, of the outage. The notification may be directed toward a user, for example in the form of a graphical display change on a device. The graphical display change can include the display of a particular icon on the device's screen. The notification may be wirelessly transmitted toward a device (e.g. UE) using the radio access portion. In some embodiments, the notification may be produced at a time prior to the beginning of the outage and may indicate the predicted future beginning time of the outage. In some embodiments, the notification indicates a predicted future end time of the outage.

Figure 4:
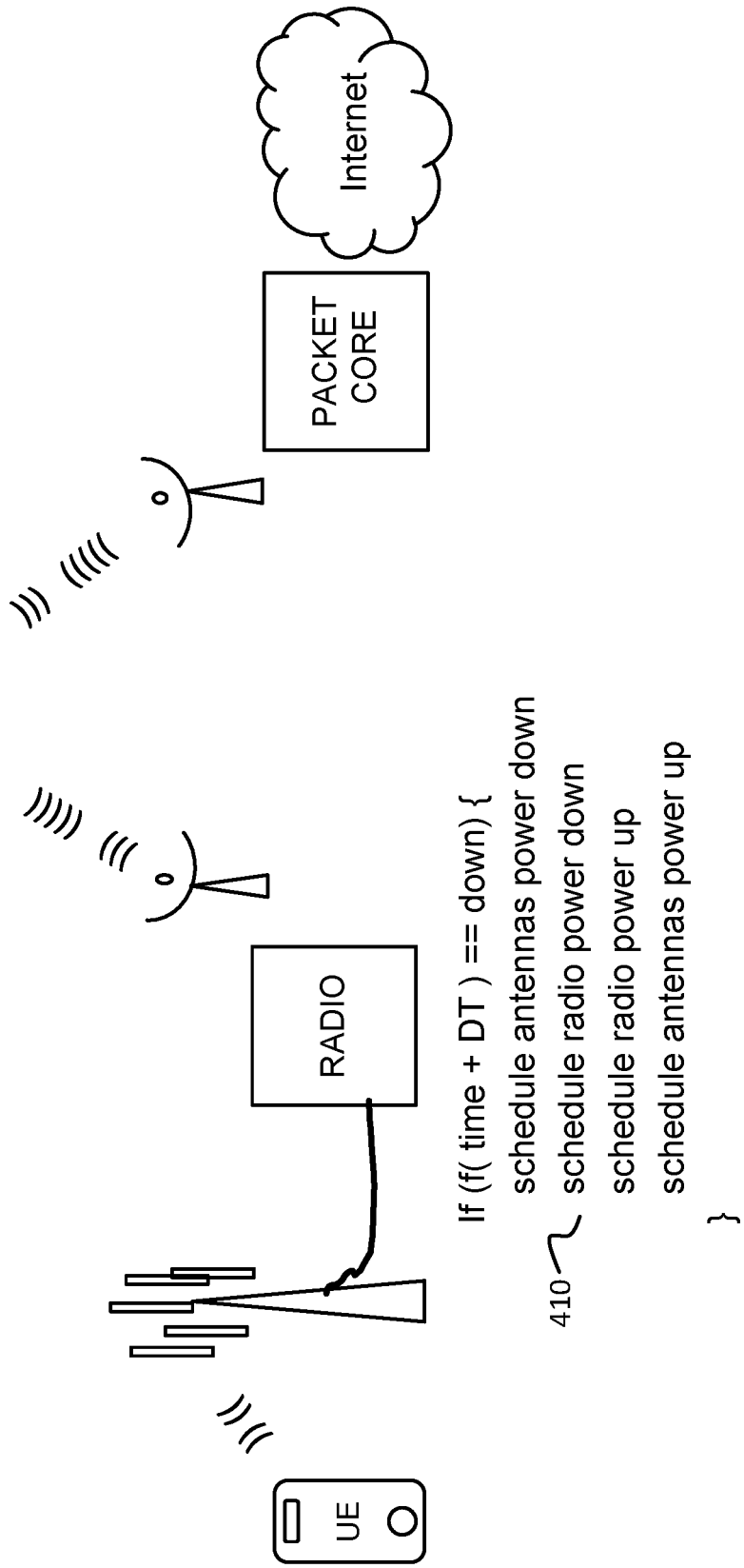
FIG. 4 illustrates a communication network taking an infrastructure power down or power up action in response to a predicted future satellite backhaul state change, according to an embodiment of the present disclosure.

In some embodiments, as illustrated in FIG. 4, an action 410 can be taken by or toward a device belonging to the RAN. In particular, if an outage state (i.e. "down") is predicted at a time which is DT time units in the future, the action may comprise scheduling a power down operation for one or more devices belonging to the RAN, or portions of such devices. The power down operation can be scheduled for a time substantially coinciding with, or in advance of, the time of the predicted outage. For example, power down operations may be scheduled for one or more antennas, or one or more radios, or one or more related pieces of equipment. Such antennas or radios may be involved with backhaul communication. An antenna may be powered up or down for example with respect to active analog circuitry for increasing signal strength, ice-melting heaters, stabilizing motors, etc. Thus, power up and down operations can be performed for antennas and co-located related equipment. Power down operations for other devices belonging to the RAN may be performed similarly. Scheduling of power up operations, as will be described elsewhere herein, is also illustrated.

Figure 5:
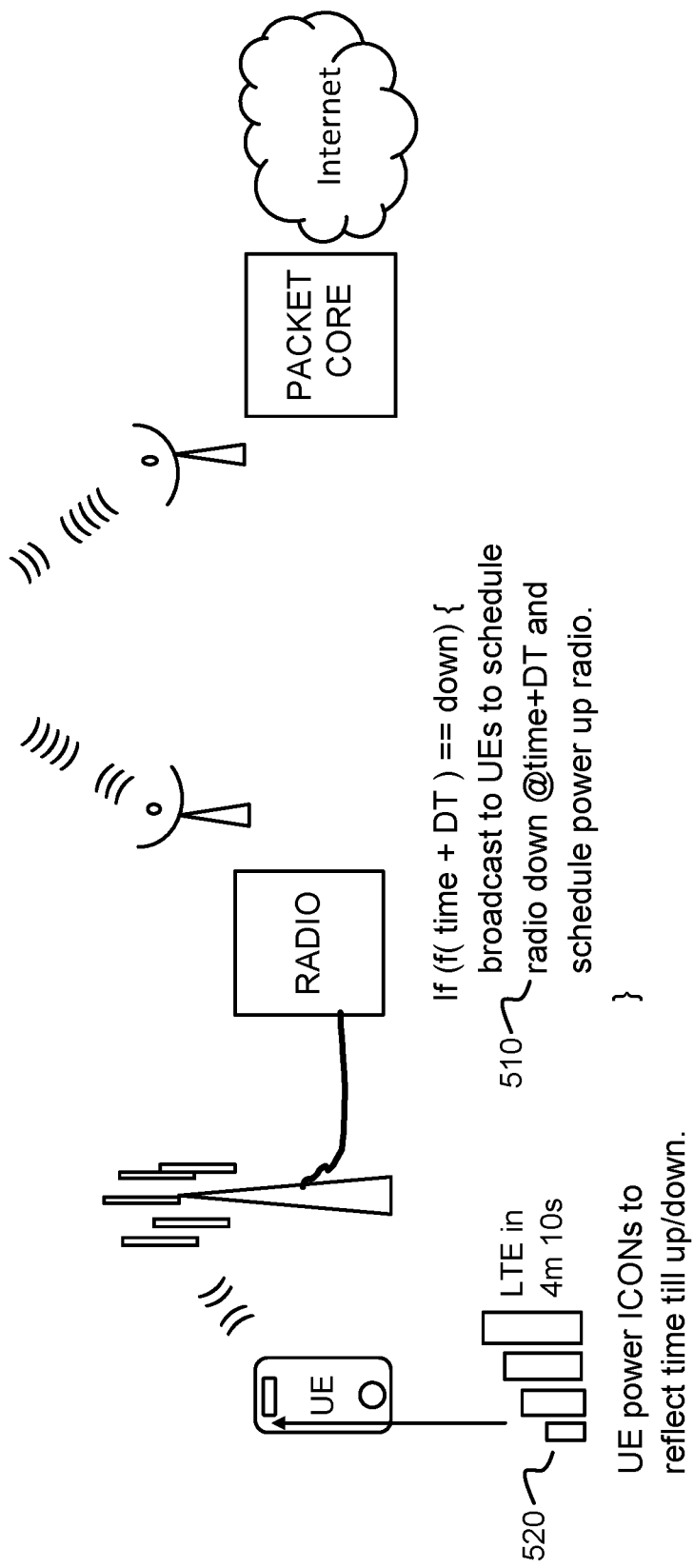
FIG. 5 illustrates a communication network taking an end device action in response to a predicted future satellite backhaul state change, according to an embodiment of the present disclosure.

In some embodiments, as illustrated in FIG. 5, an action can be taken to power down a portion of a device (e.g. UE) using the RAN. For example, if an outage is predicted at a time which is DT time units in the future, the action may comprise scheduling 510, at the time of the predicted outage, a power down operation for at least the radio of such a device. A device in the RAN can transmit an instruction to one or a plurality of devices using the RAN, the instruction causing these devices to schedule the power down operation. Alternatively, the device in the RAN can transmit a notification, and a device in receipt of the notification can determine whether or not to schedule the power down operation. Thus, the action can include transmitting a scheduling instruction or a notification. If a determination is made to schedule the power down operation, the device in receipt of the notification can then schedule the power down operation. The instruction or notification can be broadcast, multicast, or unicast.

In some embodiments, a device using the RAN can provide a status indication when a power down operation is scheduled but not yet performed, after the power down operation has been performed, when a subsequent power up operation is scheduled but not yet performed, or a combination thereof. For example, as illustrated in FIG. 5, for a UE device (a device using the RAN) having a user interface graphical display, an icon or message 520 can be displayed indicating the amount of time until (or the absolute time of) a predicted outage beginning or associated scheduled power down operation, a predicted outage end or associated scheduled power up operation, or both. When the UE device's radio is powered down, the icon or message can indicate same. As illustrated, the UE displays that LTE is currently unavailable but is predicted to become available again in 4 minutes and 10 seconds.

Figure 6:
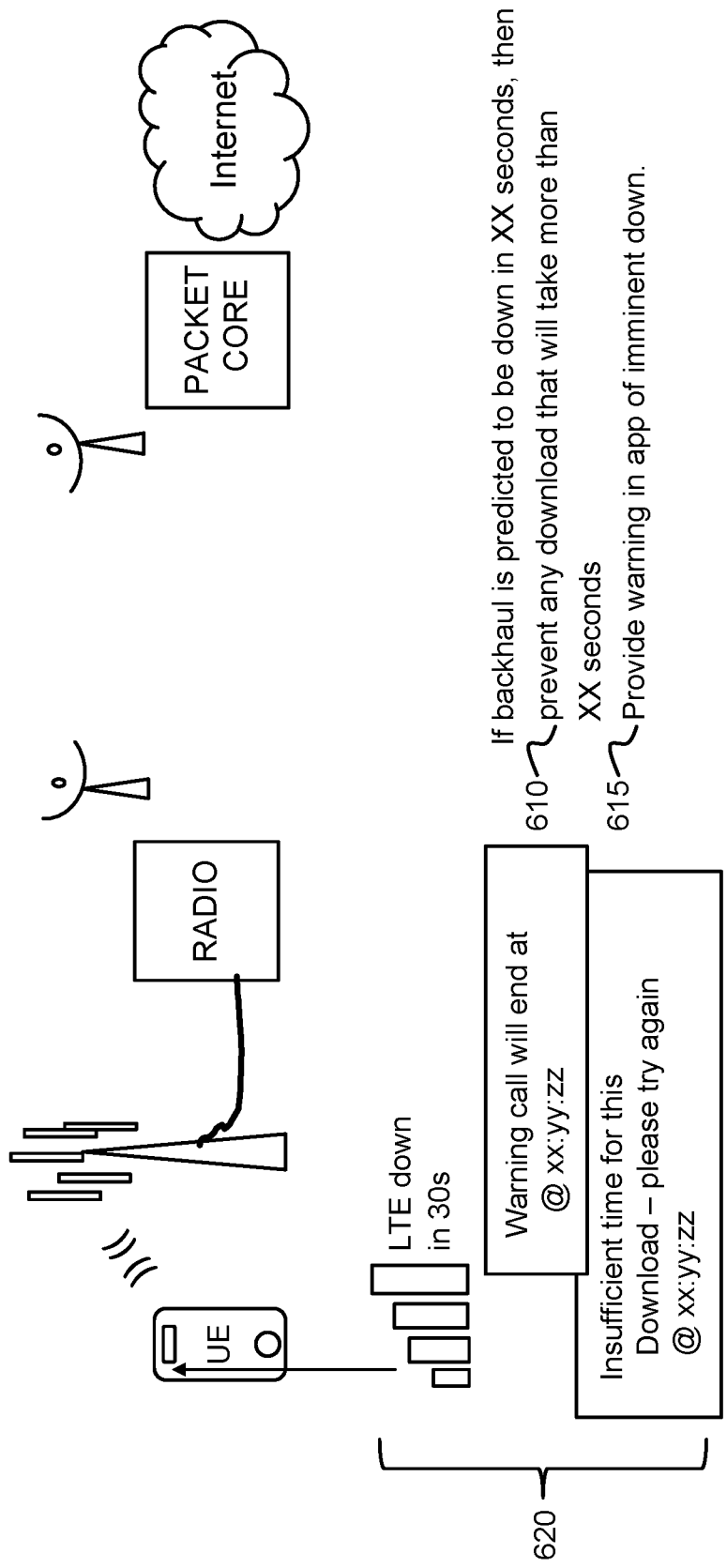
FIG. 6 illustrates a communication network taking an action to inhibit communications or issue a warning in response to a predicted future satellite backhaul state change, according to an embodiment of the present disclosure.

In some embodiments, as illustrated in FIG. 6, the action can include inhibiting certain activities for a certain period of time in advance of a predicted outage, or providing a warning regarding such activities. For example, if the backhaul is predicted to be down starting in a certain amount of time from now, then downloads which would take longer than that amount of time can be prevented 610. A warning can be issued 615 that an outage is expected to occur at a specified time, which may be an absolute time or an amount of time after the present time (e.g. "in 30 seconds"). Activities, such as data downloads or uploads that require more time than is available before the predicted outage begins, can be inhibited from occurring, or a warning can be issued that such activities likely cannot be completed in time prior to the outage beginning. Warnings to users can be useful in allowing the user to prepare for the outage, for example by ending a call and scheduling a subsequent call. Warnings to devices can be used to trigger the devices to automatically perform operations in preparation for the outage. Examples 620 of warnings which can be displayed on a device are shown.

Figure 7:
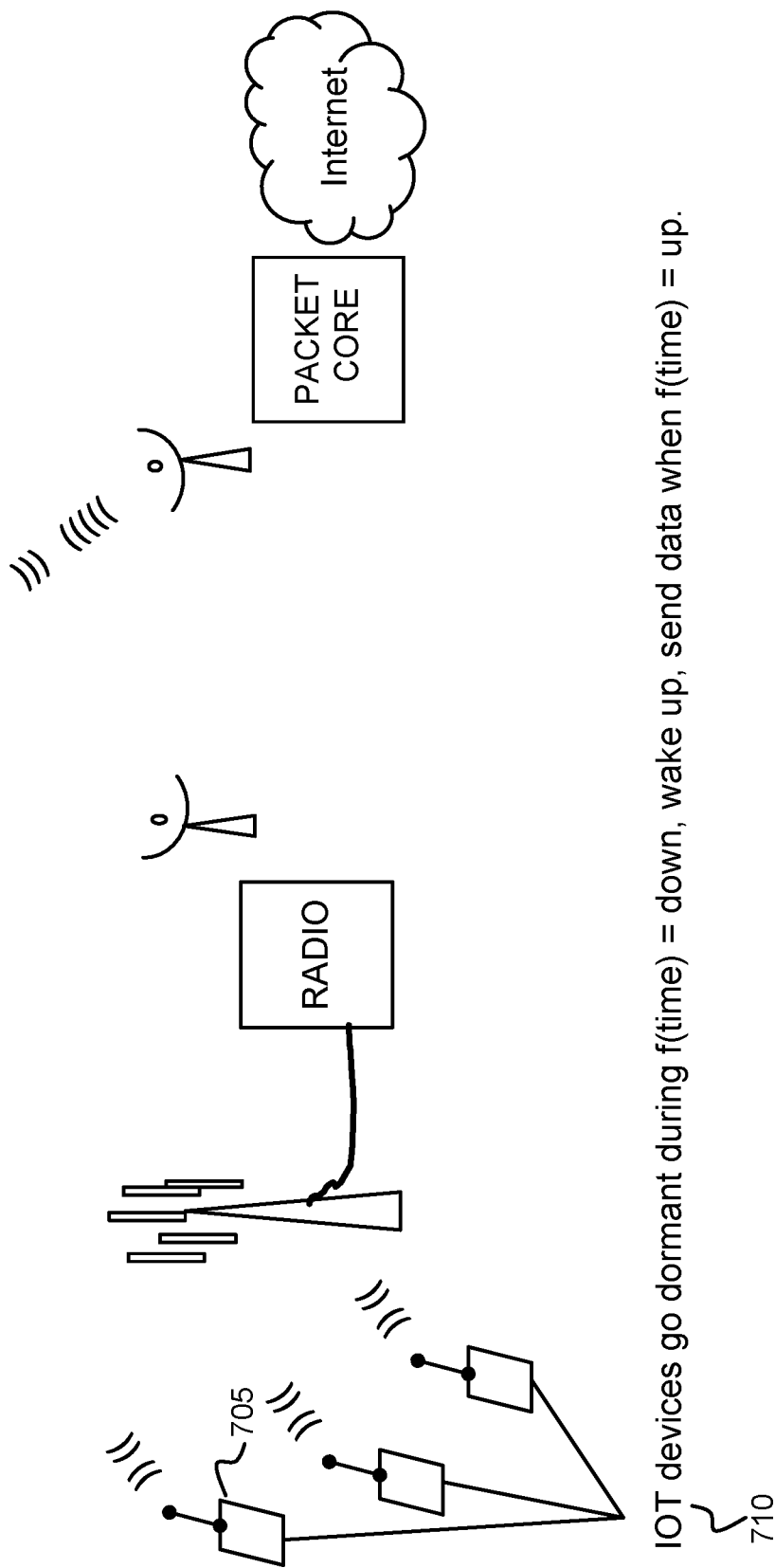
FIG. 7 illustrates a communication network taking an action to influence the sleep/wake scheduling of devices in response to a predicted future satellite backhaul state change, according to an embodiment of the present disclosure.

In some embodiments, devices using the RAN may be autonomous devices such as machine type communication (MTC) devices, machine to machine (M2M) devices or internet of things (IOT) devices. Such devices may not necessarily have a direct user interface and may automatically communicate with the RAN according to a schedule, trigger conditions, or a combination thereof. In some embodiments, as illustrated in FIG. 7, such autonomous (e.g. IOT) devices 705 may go into a dormant or sleep mode 710 during an outage. They may self-schedule such a dormant or sleep mode in response to a notification of a predicted outage, or they may go into a dormant or sleep mode in accordance with an instruction based on the predicted outage. The dormant or sleep mode may be scheduled to begin substantially at a time corresponding to, or prior to, the predicted beginning of the outage. The dormant or sleep mode may be scheduled to end substantially at a time corresponding to the predicted end of the outage. The device may thus schedule its sleep/wake cycle, at least with respect to communications, to coincide with the outage/non-outage cycle of the backhaul. In some embodiments, the device can be configured to be completely dormant for the duration of the outage. In some embodiments, the device may be configured to perform some communication operations in advance of the beginning of the outage, if time permits. For example, the device may be triggered to obtain and transmit a data sample prior to becoming dormant. Such embodiments can provide for more energy efficient operation, because the devices do not attempt communications during a backhaul outage when such communications may not be useful.

Although the above embodiments focus primarily on actions taken due to a predicted backhaul outage, in various embodiments, an action can be taken due to an end or predicted end of a backhaul outage. An action, such as a power up operation, can be scheduled for one or more devices, such as those devices mentioned above as being powered down (e.g. devices accessing the RAN or using the RAN) due to a backhaul outage. The power up operation can be scheduled to substantially coincide with, or be advance of, a predicted time at which an outage is expected to end. A device which is powered down at or in anticipation of an outage can be powered up at or in anticipation of an end of the outage, and vice-versa. Power up operations can be scheduled separately or along with power down operations. Indications of the expected time that an outage is ending can be provided to devices and users.

More generally, embodiments of the present disclosure include determining a predicted future end time of a present or predicted future outage. The predicted future end time can be obtained from the same source as the predicted outage start time. Such embodiments further include, in response to the determination of the predicted future end time, scheduling or performing an action at a device belonging to the radio access portion of the communication network, a device using the radio access portion, or a combination thereof. The action can be performed at or in advance of the predicted future end time of the outage. Such embodiments may also involve performing an action related to the beginning of a predicted outage. Actions can include notifying devices or users of the outage end, displaying an indication of the predicted end of the outage, powering up equipment, performing attachment or communication operations, scheduling one of the aforementioned or another action, or the like, or a combination thereof.

In various embodiments, the action can include resuming suspended communication operations. As already mentioned above, the action can include powering up communication equipment of the radio access portion, powering up part or all of the device using the radio access portion or a combination thereof. The action can include configuring a sleep/wake schedule of the device using the radio access portion, for example to wake substantially at or after the predicted end time. The action can include producing a notification of an end of the outage, where the notification is directed toward a user or toward the device using the radio access portion. The action can include producing a notification of the end time, where the notification is directed toward the user or toward the device using the radio access portion. The action can include transmitting a notification to one or more devices including the device using the radio access portion. The action can include performing a controlled reattach procedure involving one or more devices using the radio access portion. When scheduling an action to be performed at the end of a backhaul outage, it may be desirable to perform all communication required for such scheduling prior to the device powering down, prior to the backhaul outage beginning, or both, depending on communication requirements and capabilities.

Figure 8:
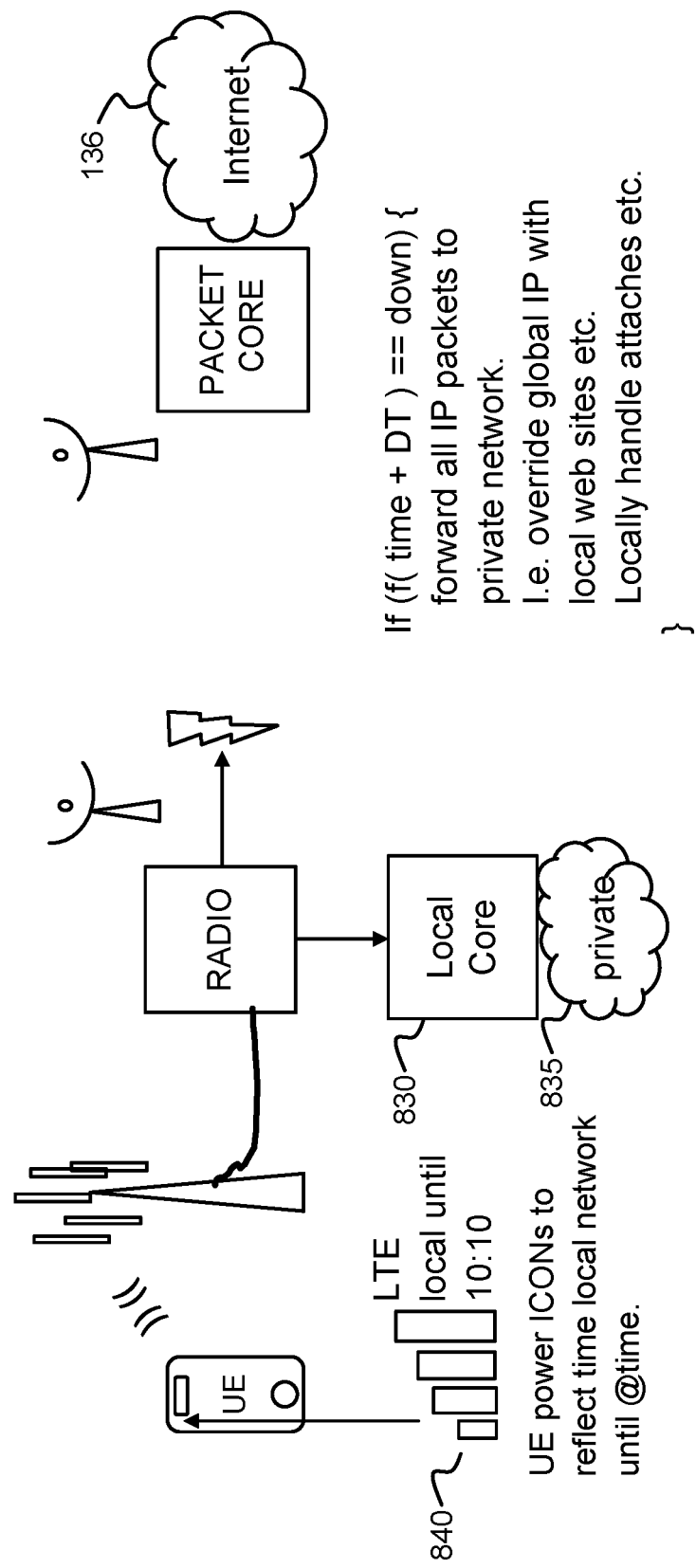
FIG. 8 illustrates a communication network taking an action to implement a local version of a core network and associated networks, and to notify devices of same, in response to a predicted future satellite backhaul state change, according to an embodiment of the present disclosure.

According to embodiments of the present disclosure, and as illustrated in FIG. 8, an action, as performed by one or more devices providing the RAN in response to a predicted future backhaul outage, can include activating a local version 830 of the core network portion for use during an outage. This local version of the core is implemented using only equipment in the radio access portion of the communication network. In some embodiments, the action can further include producing a notification 840 that the local version of the core network portion is active. The notification 840 can further indicate that the local version of the core network portion is active until a specified future time, corresponding to a predicted end of the outage. Such a notification may be directed toward one or more users, toward one or more devices using the radio access portion, or a combination thereof. Devices may display an indication or icon, indicative that the local version of the core is currently active in place of the regular core.

The local version 830 of the core network portion can perform a reduced set of functions compared to the global core network portion. It may provide local information, local device-to-device connection, etc. The local version of the core network portion can be coupled to a private network 835 or server which serves locally cached versions of websites, for example. The private network 835 may act as a substitute for portions of a larger network such as the Internet 136 can be provided using devices which are local to the radio access portion, and traffic intended for the larger network can be redirected to appropriate locations in the private network 835. The local version 830 of the core can be configured to locally handle network attachment operations of devices, and other control or management operations. In order to redirect traffic, when the backhaul is down, the local version 830 may be configured to forward IP packets to the private network 835, for example by overriding global IP destination addresses with corresponding local IP destination addresses. The private network may include data which is obtained, for example periodically, from the global version of the network when the backhaul is in service.

Figure 9:
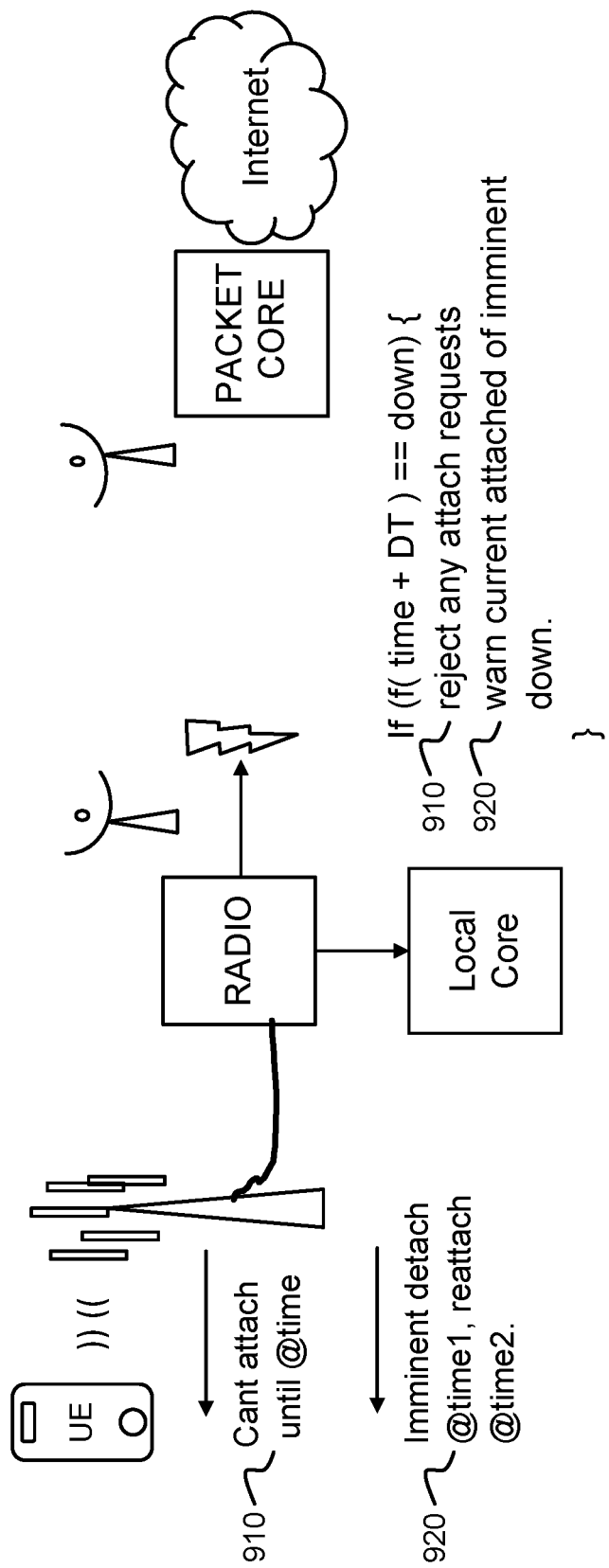
FIG. 9 illustrates a communication network taking an action to inhibit network attachment attempts and to warn devices of an upcoming network detachment event, in response to a predicted future satellite backhaul state change, according to an embodiment of the present disclosure.

According to embodiments of the present disclosure, and as illustrated in FIG. 9, the action may include, during a certain time interval prior to the beginning of a predicted outage, inhibiting or rejecting 910 connection attempts (e.g. in the form of new attach requests) from a device attempting to begin using the RAN. Along with the rejection, a message may be sent to devices indicating the predicted end time of the outage, or another appropriate time to re-attempt usage of the RAN. Additionally or alternatively, the action may include, during the certain time interval, transmitting an indication (notification) 920, to currently attached devices using the RAN, that an outage is imminent. These rejections and indications can be made when the backhaul is predicted to be in outage ("down") a certain amount of time DT in the future, where DT falls within some given range. The indication may further include that the device will be detached from the RAN. In some embodiments, the action may include initiating a controlled detach procedure, by a device in the RAN or a device using the RAN, in response to and in advance of a predicted outage. Such a controlled detach procedure may be preferable for example because devices will not continue attempting communications that would normally be performed if the device were still attached but the backhaul was unavailable. The rejections 910 and indications 920 can include an indication of a predicted future time when attachment or reattachment can occur, due to the backhaul being available again at such a predicted future time. That is, the predicted future time can coincide with a predicted end of the outage. In various embodiments, the connection rejections and suggested indications of time that re-attachment may be initiated may be performed by a local version of the core network.

Figure 10:
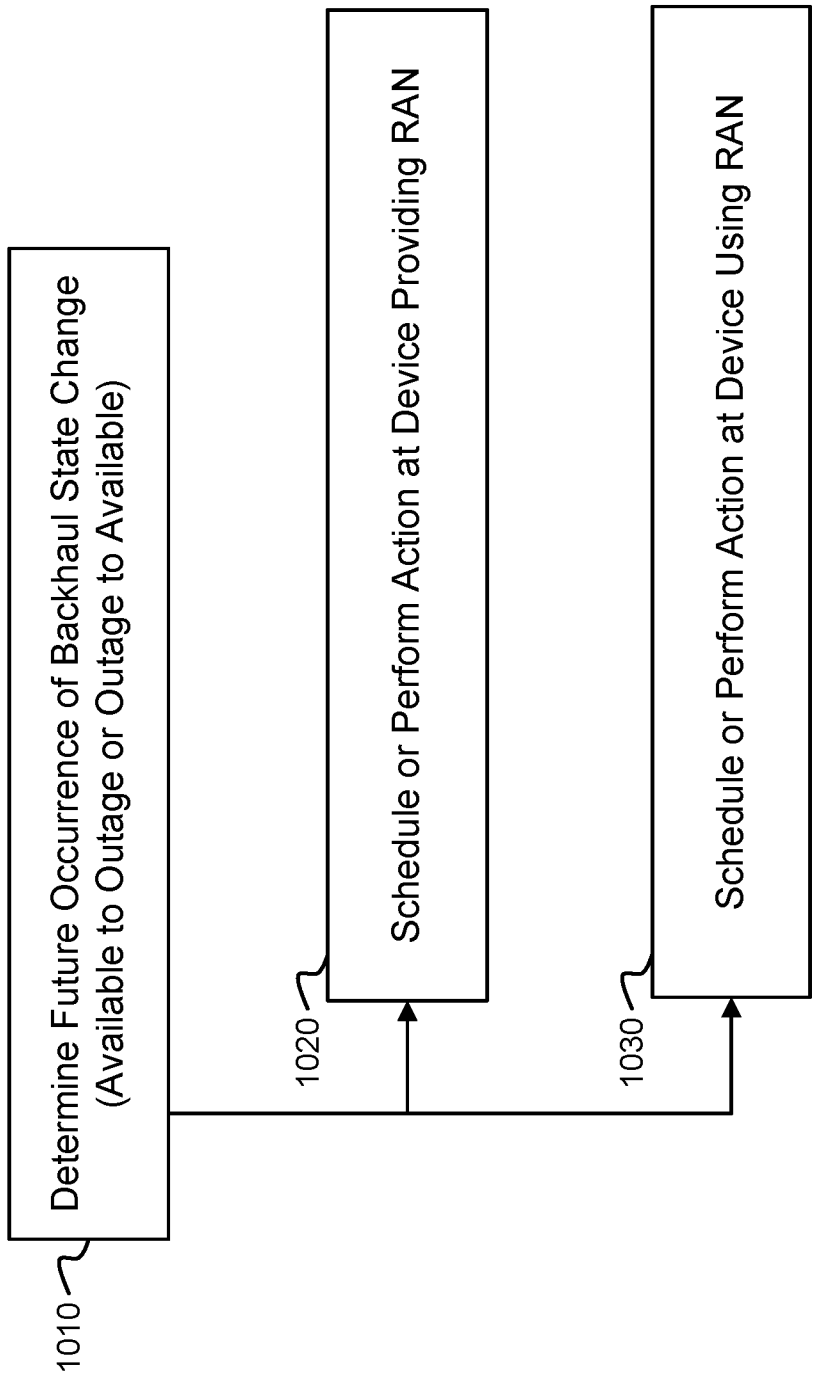
FIG. 10 illustrates a method provided in accordance with embodiments of the present disclosure.

FIG. 10 illustrates a method performed in accordance with an embodiment of the present disclosure, as described above. The method includes determining 1010 a future occurrence of a backhaul state change. The state change can be a change from the backhaul being in an available, operational state to the backhaul being in an outage state. The state change can be a change from the backhaul being in an outage state to the backhaul being in an available, operational state. The determination can involve making a prediction based on a geographic location and satellite constellation data. The determination can involve receiving a prediction from an external entity which makes the prediction. The method further involves scheduling or performing 1020 an action at a device providing the radio access portion (RAN) of the communication network. This can be an action which places an infrastructure device into a power down state, or an action of rerouting traffic to a local core, or which powers up the device in the case of the backhaul becoming available, etc. The action can be scheduled for substantially the time at which the outage is predicted to occur, or at a time in advance of such a time. The method further involves scheduling or performing 1020 an action at a device using the radio access portion (RAN) of the communication network, such as a UE or IOT device. This can be an action which places the device in a power down or sleep state, or which provides a user notification, or which powers up the device in the case of the backhaul becoming available, etc. Various actions as described above can be taken.

Figure 11:
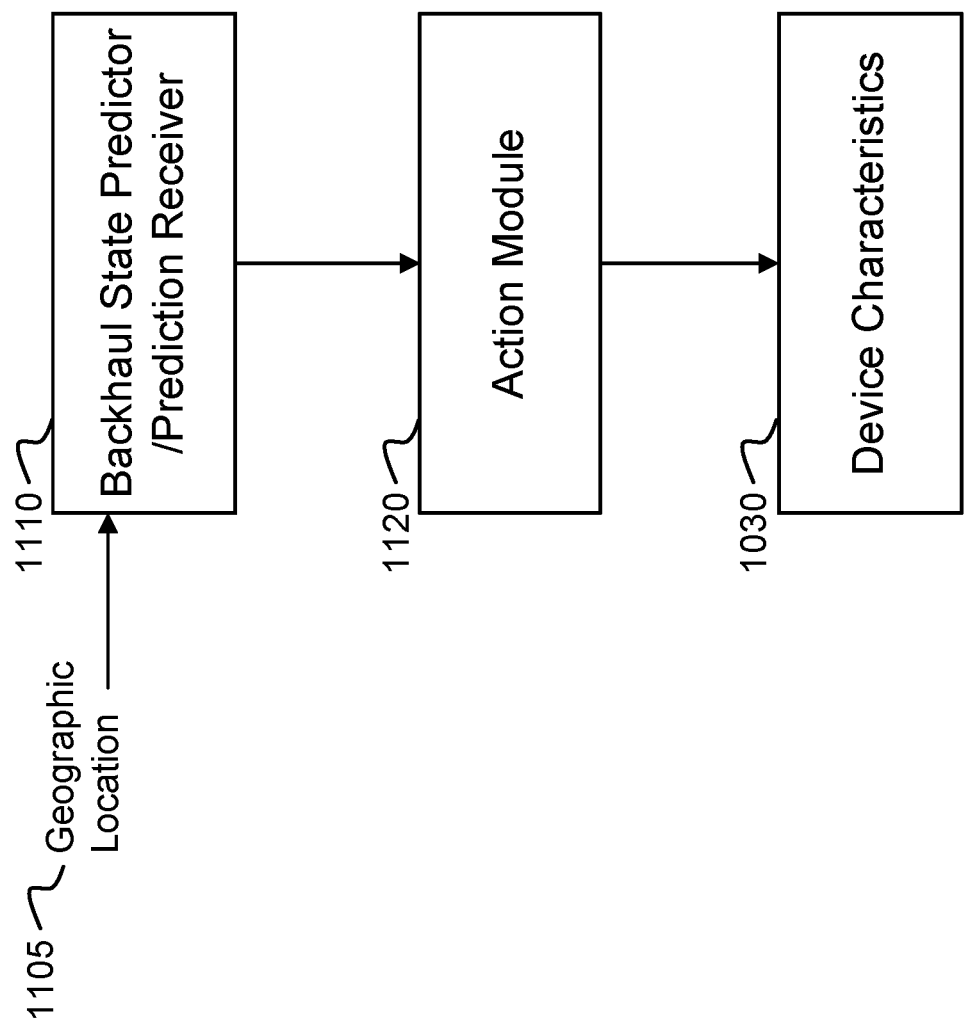
FIG. 11 illustrates an apparatus provided in accordance with embodiments of the present disclosure.
Figure 12:
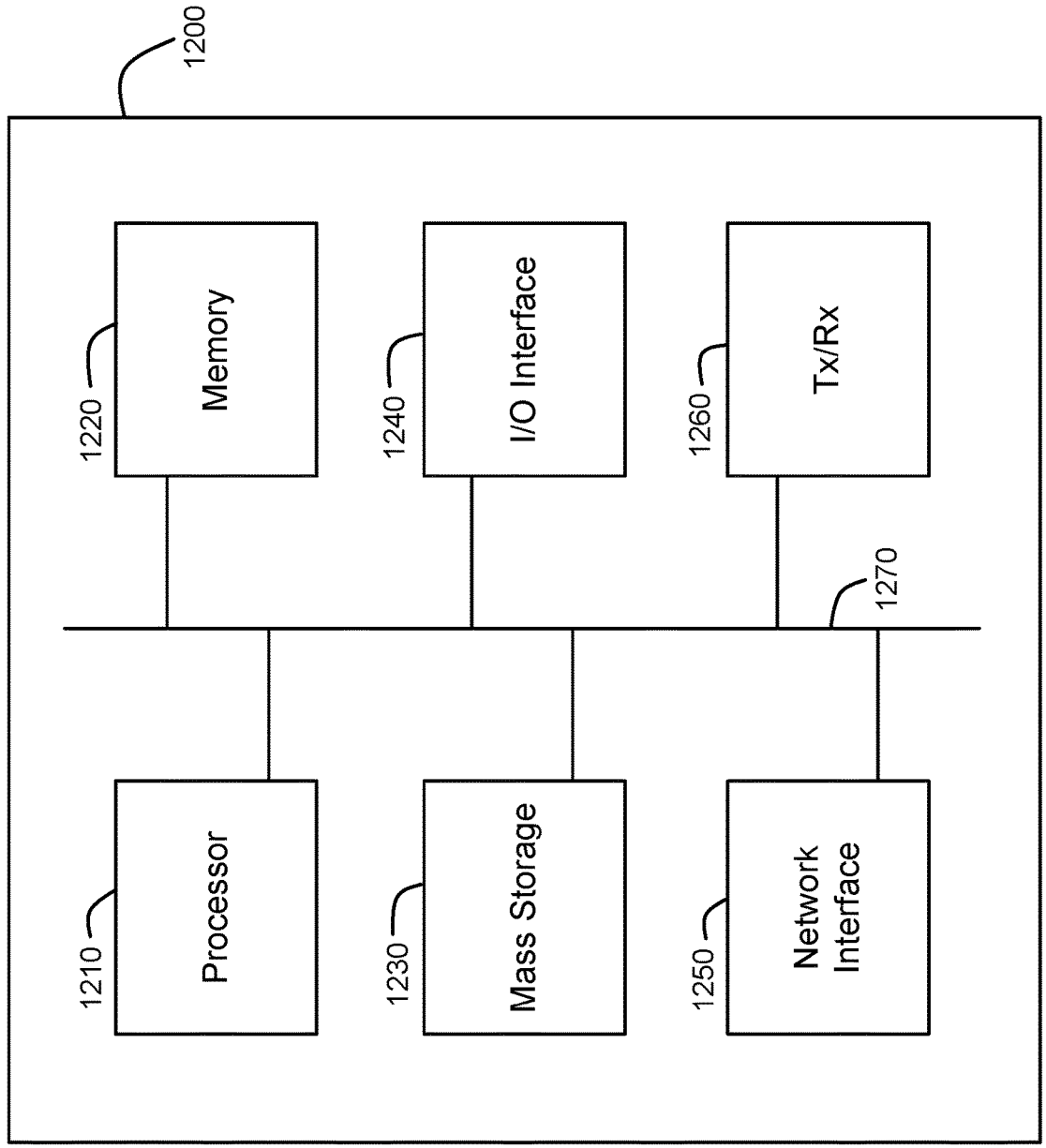
FIG. 12 is a schematic diagram of an electronic device, according to embodiments of the present disclosure.

FIG. 11 illustrates functional aspects of an electronic device, in accordance with embodiments of the present disclosure. Such functional aspects can be provided by an electronic device, such as illustrated in FIG. 12, by execution of appropriate computer program instructions stored in memory. Alternatively, dedicated electronic hardware or firmware may be provided which, when implemented, causes the electronic device to exhibit the functional aspects. A backhaul state predictor or backhaul state prediction receiver 1110 makes or receives predictions as to the future state of the satellite backhaul. This can be based at least in part on the geographic location 1105 of the electronic device. The prediction can include a set of times at which the backhaul changes between available and outage states, or equivalently a continuum of times with indications, for each time, as to what state the backhaul is in. The predictions can be based on the geographic location information and information regarding orbital position of satellites capable of providing the backhaul or access to the backhaul network. The predictions can further be based on reported information indicative of states of satellites, e.g. as being either in an active or non-active state with respect to being able to communicate with ground in such a capacity as to provide a backhaul link. The action module 1120 causes the device to perform one or more actions based on output of the predictor/prediction receiver 1110, at one or more times which are based on times supplied by the predictor/prediction receiver 1110. For example, the action module can cause the device to transmit a message (notification or instruction), or perform a power down or sleep operation, or perform a power up or wake operation, or provide a user notification. Such actions can be taken substantially at the time of a predicted backhaul state change, or a suitable time prior to such a backhaul state change. The amount of time between the action and the state change can depend on the action and operational requirements. For example, notifying a user or device of an upcoming outage can be performed several minutes in advance of the outage, in order to provide the user with adequate notice. Device characteristics 1130 such as user display characteristics, messaging behaviour, attachment behaviour, module power up/down status, sleep/wake status, etc. can be influenced by the action module 1120.

FIG. 12 is a schematic diagram of an electronic device 1200 that may perform any or all of the steps of the above methods and features described herein, according to different embodiments of the present disclosure. For example, network infrastructure devices, end-user computers, smartphones, IoT devices, laptops, tablet personal computers, electronic book readers, gaming machine, media players, devices performing tasks in relation to graphical display, physical machines or servers, or other computing devices can be configured as the electronic device.

As shown, the device includes a processor 1210, such as a Central Processing Unit (CPU) or specialized processors such as a Graphics Processing Unit (GPU) or other such processor unit, memory 1220, non-transitory mass storage 1230, I/O interface 1240, network interface 1250, and a transceiver 1260, all of which are communicatively coupled via bi-directional bus 1270. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   determining a predicted future occurrence of an outage in a backhaul network, said outage being due to orbital position and state of satellites forming at least part of the backhaul network and interrupting communication between a radio access portion of a communication network and a core portion of the communication network; and
   in response to said determining the predicted future occurrence of the outage, scheduling or performing an action at one or both of: a device providing the radio access portion of the communication network; and a device using the radio access portion, the action being performed at a time prior to a beginning of the outage.

2. The method of claim 1, wherein the action comprises one or more of: proactively suspending communication operations in an orderly manner; powering down communication equipment of the radio access portion; powering down part or all of the device using the radio access portion; and configuring a sleep/wake schedule of the device accessing the communication network using the radio access portion.

3. The method of claim 1, wherein the action is performed at a first time interval prior to the beginning of the outage, and wherein the action comprises inhibiting start of one or more operations which require a duration for completion which is greater than the first time interval.

4. The method of claim 1, wherein the action comprises producing a notification of the outage, the notification being directed toward a user or toward the device using the radio access portion.

5. The method of claim 4, wherein the notification is produced at the time prior to the beginning of the outage and indicates a time corresponding to the beginning of the outage.

6. The method of claim 4, wherein the notification indicates a predicted future end time of the outage.

7. The method of claim 1, wherein the action comprises activating a local version of the core network portion, said local version being implemented using only equipment in the radio access portion of the communication network, and producing a notification that the local version of the core network portion is active, the notification being directed toward a user or toward the device using the radio access portion.

8. The method of claim 1, wherein the action comprises one or more of: transmitting a notification to one or more devices including the device using the radio access portion; performing a controlled detach procedure involving said one or more devices; and inhibiting or rejecting new attach requests from said one or more devices.

9. The method of claim 1, further comprising:
   determining a predicted future end time of the outage; and
   in response to said determining the predicted future end time of the outage, scheduling or performing a further action at one or both of: the device belonging to the radio access portion of the communication network; and the device using the radio access portion, the further action being performed at or in advance of the end time.

10. The method of claim 9, wherein the further action comprises one or more of: resuming suspended communication operations; powering up communication equipment of the radio access portion; powering up part or all of the device using the radio access portion; configuring a sleep/wake schedule of the device using the radio access portion; producing a notification of an end of the outage, the notification being directed toward a user or toward the device using the radio access portion; producing a notification of the end time, the notification being directed toward the user or toward the device using the radio access portion; transmitting a notification to one or more devices including the device using the radio access portion; and performing a controlled reattach procedure involving said one or more devices.

11. An apparatus comprising a computer processor, a memory and a communication interface and configured to:
determine a predicted future occurrence of an outage in a backhaul network, said outage being due to orbital position and state of satellites forming at least part of the backhaul network and interrupting communication between a radio access portion of a communication network and a core portion of the communication network; and
in response to said determining the predicted future occurrence of the outage, schedule or perform an action at one or both of: a device providing the radio access portion of the communication network; and a device using the radio access portion, the action being performed at a time prior to a beginning of the outage.

12. The apparatus of claim 11, wherein the action comprises one or more of: proactively suspending communication operations in an orderly manner; powering down communication equipment of the radio access portion; powering down part or all of the device using the radio access portion; and configuring a sleep/wake schedule of the device accessing the communication network using the radio access portion.

13. The apparatus of claim 11, wherein the action is performed at a first time interval prior to the beginning of the outage, and wherein the action comprises inhibiting start of one or more operations which require a duration for completion which is greater than the first time interval.

14. The apparatus of claim 11, wherein the action comprises producing a notification of the outage, the notification being directed toward a user or toward the device using the radio access portion.

15. The apparatus of claim 14, wherein the notification is produced at the time prior to the beginning of the outage and indicates a time corresponding to the beginning of the outage.

16. The apparatus of claim 11, wherein the notification indicates a predicted future end time of the outage.

17. The apparatus of claim 11, wherein the action comprises activating a local version of the core network portion, said local version being implemented using only equipment in the radio access portion of the communication network, and producing a notification that the local version of the core network portion is active, the notification being directed toward a user or toward the device using the radio access portion.

18. The apparatus of claim 11, wherein the action comprises one or more of: transmitting a notification to one or more devices including the device using the radio access portion; performing a controlled detach procedure involving said one or more devices; and inhibiting or rejecting new attach requests from said one or more devices.

19. The apparatus of claim 11, further configured to:
determine a predicted future end time of the outage; and
in response to said determining the predicted future end time of the outage, schedule or perform a further action at one or both of: the device belonging to the radio access portion of the communication network; and the device using the radio access portion, the further action being performed at or in advance of the end time.

20. The apparatus of claim 19, wherein the further action comprises one or more of: resuming suspended communication operations; powering up communication equipment of the radio access portion; powering up part or all of the device using the radio access portion; configuring a sleep/wake schedule of the device using the radio access portion; producing a notification of an end of the outage, the notification being directed toward a user or toward the device using the radio access portion; producing a notification of the end time, the notification being directed toward the user or toward the device using the radio access portion; transmitting a notification to one or more devices including the device using the radio access portion; and performing a controlled reattach procedure involving said one or more devices.

* * * * *